ABSTRACT OF THE DISCLOSURE

Water-insoluble 2,4 - dinitro-6-alkylsulfonylphenyl-azo-3'-alkoxy-4'-(N-alkyl-N-acyloxy-, alkoxycarbonyl- or alkoxycarbonyloxy-alkylamino)benzenes, substituted in the 5'-position with either alkyl, alkoxy, acylamino, alkoxycarbonylamino, aralkoxycarbonylamino or aryloxycarbonylamino, are disperse dyes.

---

This invention relates to new dyes which are virtually insoluble in water and are of the formula

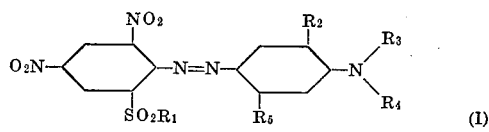

where $R_1$ is a member selected from the group consisting of unsubstituted and halogen-, cyano- and hydroxy-substituted methyl and ethyl,
$R_2$ stands for methoxy or ethoxy,
$R_3$ stands for methyl, ethyl, propyl or butyl,
$R_4$ is a member selected from the group consisting of unsubstituted and halogeno-, cyano-, alkoxy- or acyl-substituted acyloxyalkyl, alkoxycarbonylalkyl and alkoxycarbonyloxyalkyl; and
$R_5$ is a member selected from the group consisting of alkyl and alkoxy, unsubstituted and halogeno-, alkoxy- or aryloxy-substituted acylamino, alkoxycarbonylamino, aralkoxycarbonylamino and aryloxycarbonylamino.

The process of their production consists of coupling a diazotized amine of formula

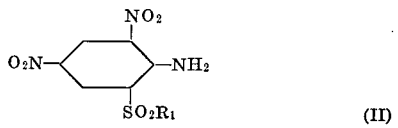

with a compound of formula

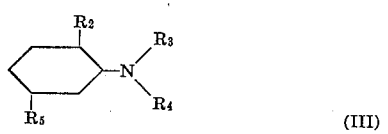

Especially preferred dyestuffs are of the formula

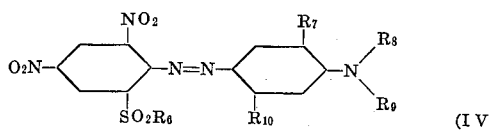

where $R_6$ is a member selected from the group consisting of unsubstituted and chloro-, bromo- or cyano-substituted methyl, unsubstituted and hydroxy-substituted ethyl,
$R_7$ stands for methoxy or ethoxy,
$R_8$ stands for methyl, ethyl, propyl or butyl, $R_9$ is a member selected from the group consisting of acetoxyethyl, chloroacetoxyethyl, ethoxyacetoxyethyl, propyloxyacetoxyethyl, butoxyacetoxyethyl, acetoxyacetoxy ethyl, propionylacetoxyethyl, butyrylacetoxyethyl, propionyloxyethyl, methoxycarbonylethyl, chloromethoxycarbonylethyl, methoxymethoxycarbonylethyl, ethoxycarbonylethyl, methoxyethoxycarbonylethyl, propyloxycarbonylethyl, methoxycarbonyloxyethyl, ethoxycarbonyloxyethyl, (2-methoxypropyl)-carbonyloxyethyl, propionyloxyethyl, bromopropionyloxyethyl, methoxy propionyloxyethyl, chloromethoxypropionyloxyethyl, cyanomethoxypropionyloxyethyl, ethoxypropionyloxyethyl and propionylpropionyloxyethyl, $R_{10}$ is a member selected from the group consisting of methoxy, ethoxy, acetylamino, chloroacetylamino, methoxyacetylamino, ethoxyacetylamino, propyloxyacetylamino, methoxycarbonylamino, ethoxycarbonylamino, propylcarbonylamino, propyloxycarbonylamino, halogenoethoxycarbonylamino, methoxyethoxycarbonylamino, phenyloxycarbonylamino, phenylmethoxycarbonylamino, propionylamino, halogenopropionylamino, methoxypropionylamino and ethoxypropionylamino.

The following amines are examples of suitable diazo components:

2-amino-3,5-dinitro-1-methylsulphonylbenzene,
2-amino2,5-dinitro-1-ethylsulphonylbenzene,
2-amino-3,5-dinitro-1-chloromethylsulphonylbenzene,
2-amino-3,5-dinitro-1-cyanomethylsulphonylbenezene,
2-amino-3,5-dinitro-1-hydroxyethylsulphonylbenzene,
2-amino-3,5-dinitro-1,β'-chloroethylsulphonylbenzene.

Examples of suitable coupling components are:

5-acetylamino-1-N-(2'-acetoxyethyl)-N-ethylamino-5-methoxybenzene,
5-acetylamino-1-N-(2'-acetoxyethyl)-N-ethylamino-5-ethoxybenzene,
5-acetylamino-2-ethoxy-1-N-(2'-acetoxyethyl)-N-propylaminobenzene,
5-acetylamino-2-ethoxy1-N-(2'-acetoxyethyl)-N-methylaminobenzene,
5-acetylamino-2-ethoxy-1-N-(2'-acetoxyethyl)-N-butylaminobenzene,
5-acetylamino-2-ethoxy-1-N-ethyl-N-(2'-methoxycarbonylethyl)aminobenzene,
5-acetylamino-2-ethoxy-1-N-ethyl-N-(2'-carbethoxyoxyethyl)aminobenzene,
5-acetylamino-2-ethoxy-1-N-ethyl-n-(3'-acetoxypropyl) aminobenzene-1-N-ethyl-N-(2'acetoxyethyl)amino-3-methoxy-5-propionylaminobenzene,
1-N-ethyl-N-(2'-acetoxyethyl)amino-2-methoxy-5-methylbenzene,
1-N-ethyl-N-(2'-acetoxyethyl)amino-2,5-dimethoxybenzene,
1-N-ethyl-N-(2'-acetoxyethyl)amino-5-(2'-chloropropionyl)amino-2-methoxybenzene,
2-ethoxy-1-N-ethyl-N-(2'-acetoxyethyl)amino-5-(2'-chloroethoxycarbonyl)aminobenzene,
2-ethoxy-1-N-ethyl-N-(2'-acetoxyethyl)amino-5-carbethoxyaminobenzene,
2-ethoxy-1-N-(2'acetoxyethyl)-N-butylamino-5-carbethoxyaminobenzene.

Generally the coupling reaction is effected in an acid medium, which may be buffered if necessary, and with cooling, for example at temperatures of 0° to 5° C.

The new dyes thus obtained are excellent disperse dyes. It is of special advantage to convert them by known methods into dye preparations before use. This is effected by comminution to an average particle size of about 0.01 to 10 microns or more particularly 0.1 to 5 microns. Comminution can be carried out in the presence of dispersants or fillers. For example, the dried dye can be ground with a dispersant, if necessary in the presence of fillers, or it can be kneaded in paste form with a dispersing agent and subsequently vacuum or jet dried.

After the addition of a suitable volume of water the resulting preparations can be used for dyeing, padding or printing at long or short liquor ratios. For dyeing at long liquor ratios it is general practice to use amounts of up to about 20 grams of dye per litre; for padding, up to about 150 grams or preferably 0.1 to 100 grams per litre; and for printing, up to about 150 grams per kilogram of the print paste. The liquor ratio may vary within wide limits, e.g., from about 1:3 to 1:200 or preferably 1:3 to 1:80.

The dyes build up excellently from aqueous dispersion on products made of synthetic or semisynthetic hydrophobic organic articles of high molecular weight. They are especially suitable for dyeing, padding or printing filaments, loose fibres and textile materials of linear aromatic polyesters, cellulose diacetate and cellulose triacetate. They can also be used for dyeing synthetic polyamides, polyolefins, acrylonitrile polymerization products and polyvinyl compounds. High quality dyeings are obtained on linear aromatic polyesters, which in the main are polycondensation products of terephthalic acid and glycols, notably ethylene glycol, and are marketed under the registered trade names "Terylene," "Diiolen," "Dacron," etc.

The known dyeing methods are used. Polyester fibres can be exhaustion dyed in the presence of carriers at temperatures of about 80° to 125° C., or in the absence of carriers, under pressure at about 100° to 140° C. These fibres can also be padded or printed with aqueous dispersions of the new dyes and the paddings or prints fixed at about 140° to 230° C. with the aid of water vapour or air. In the optimum temperature range of 180° to 220° C. the dyes diffuse rapidly into polyester fibre and do not then sublime, even when exposed for some length of time to these high temperatures, so that there is no inconvenient contamination of the dyeing and fixing equipment. Cellulose diacetate is dyed preferably in the temperature range of about 65° to 80° C. and cellulose triacetate, at temperatures up to about 115° C. The optimum pH region is 2 to 9 or more particularly 4 to 8.

The normal dispersing agents, preferably those of anionic or nonionic character, can be used, either alone or in mixture. Often about 0.5 gram dispersing agent per litre of the dyeing medium is sufficient, although larger amounts up to about 3 grams per litre can be used. Amounts in excess of 5 grams do not usually offer any further advantage. Known anionic dispersing agents suitable for the process are, for example, the condensation products of naphthalenesulphonic acids and formaldehyde, in particular dinaphthylmethane disulphonates, the esters of sulphonated succinic acid, Turkey red oil, the alkaline salts of the sulphuric acid esters of fatty alcohols, e.g., sodium lauryl sulphate or sodium cetyl sulphate, sulphite cellulose waste liquor and its alkaline salts, soaps, and the alkaline sulphates of the monoglycerides of fatty acids. Examples of known and specially suitable nonionic dispersing agents are the adducts of approximately 3–40 mols of ethylene oxide with alkyl phenols, fatty alcohols or fatty amines, and their neutral sulphuric acid esters.

The normal thickening agents are used for padding and printing, e.g., modified or unmodified natural products such as sodium alginates, British gum, gum Arabic, crystal gum, locust bean gum, gum tragacanth, carboxymethyl cellulose, hydroxyethyl cellulose, starches, or synthetic products, such as polyacrylamides and polyvinyl alcohol.

The dyeings obtained are extremely fast to heat (i.e., thermofixation, sublimation and pleating), gas fumes, cross dyeing, dry cleaning, chlorine, and to wet tests, such as water, washing and perspiration. The dischargeability and reserve of wool and cotton are good. The light fastness is outstanding even in pale shades, which makes the new dyes very suitable as components for the production of fashionable combination shades in pastel depths.

The dyes are stable to boiling and reduction at temperatures up to at least 220° C., showing particularly good stability at 80° to 140° C.; this stability is not adversely affected either by the liquor ratio or by the presence of dyeing accelerants.

The blue members of this new group of dyes are suitable for combination with small amounts of red dyes for the production of low-cost navy blue dyeings which are fast to light, washing, perspiration, sublimation, pleating and thermofixation, and also for combination with red and yellow dyes for fast black dyeings. Combination dyeings with yellow dyes shown an even tone-in-tone fade on exposure to light.

In the following examples the parts and percentages are by weight and the temperatures are in degrees centigrade.

EXAMPLE 1

6.9 parts of finely divided sodium nitrite are added slowly with stirring to 120 parts of concentrated sulphuric acid at 60–70°. Stirring is continued for 10 minutes at 60°, then after cooling to 10° 100 parts of glacial acetic acid are added at 10–15°, followed by 26.1 parts of 2-amino-3,5-dinitro-1-methylsulphonylbenzene and 100 parts of glacial acetic acid. After stirring for a further 4 hours, the resulting diazonium salt solution is run into a mixture of 33.6 parts of 5-acetylamino-2-ethoxy-1-N-(2'-acetoxyethyl)-N-butylaminobenzene, 100 parts of glacial acetic acid, 10 parts of aminosulphonic acid and 200 parts of ice. The coupling reaction is brought to completion in acid medium by adjusting the pH to 2.0–2.5 with sodium acetate. The dye forms immediately and settles out. It is filtered off, washed free of acid and dried. It dyes synthetic fibres in greenish blue shades which have excellent fastness properties.

Dyeing instructions 1

A mixture of 7 parts of the dye obtained as described in Example 1, 4 parts of sodium dinaphthylmethanedisulphonate, 4 parts of sodium cetylsulphate and 5 parts of anhydrous sodium sulphate is ground in a ball mill for 48 hours to give a fine powder. 2 parts of the powder are dispersed in 3000 parts of water containing 3 parts of a 30% solution of a highly sulphonated castor oil and 20 parts of an emulsion of a chlorinated benzene. At 20–25° 100 parts of a fabric of "Dacron" (registered trade mark) polyester fibre are entered into the bath, its temperature is raised to 95–100° in about 30 minutes and the fabric dyed for 1 hour at this temperature. On removal from the bath the fabric is rinsed, soaped for 15 minutes at 70° with a 0.1% solution of an alkylphenylpolyglycol ether, rinsed again and dried. A greenish blue dyeing with excellent fastness properties is obtained.

Dyeing instructions 2

A mixture of 30 parts of the dye obtained as described in Example 1, 40 parts of sodium dinaphthylmethanedisulphonate, 50 parts of sodium cetylsulphate and 50 parts of anhydrous sodium sulphate is ground in a ball mill for 48 hours to a fine powder. 4 parts of this powder are added to 1000 parts of water at 40–50°. 100 Parts of a fabric of "Terylene" (registered trademark) polyester fibre are entered into the bath, the temperature is increased at a low rate and the fabric dyed for about 1 hour at 130° under pressure. On removal it is rinsed, soaped, rinsed and dried. A greenish blue dyeing having excellent fastness properties is obtained.

Dyeing instructions 3

A mixture of 15 parts of the dye obtained as described in Example 1, 20 parts of sodium dinaphthylmethanedisulphonate, 25 parts of sodium cetylsulphate and 25 parts of anhydrous sodium sulphate is ground in a ball mill for 48 hours to a fine powder. 5 parts of the powder are added to 4000 parts of water. 100 parts of a scoured fabric of "Arnel" (registered trademark) triacetate fibre are entered into the bath, the temperature increased slowly to 95–100° and the fabric dyed at this temperature for about 1 hour. On removal it is rinsed, soaped for 15 minutes at 70° with a 0.1% solution of an alkylphenylpolyglycol ether, rinsed again and dried. A greenish blue dyeing having good fastness properties is obtained.

The dyes set out in the following table are produced in accordance with the procedure of Example 1 from a diazotized amine of Formula II and a compound of Formula III.

| Example No. | $R_1$ | $R_2$ | $R_3$ | $R_4$ | $R_5$ | Shade on Polyester Fibre |
|---|---|---|---|---|---|---|
| 2 | $-CH_3$ | $-OCH_2CH_3$ | $-CH_3$ | $-CH_2CH_2OCOCH_3$ | $-NHCOCH_3$ | Blue. |
| 3 | $-CH_3$ | $-OCH_2CH_3$ | $-C_2H_5$ | $-CH_2CH_2OCOCH_3$ | $-NHCOCH_3$ | Do. |
| 3 | $-CH_3$ | $-OCH_2CH_3$ | $-C_2H_5$ | $-CH_2CH_2OCOCH_3$ | $-NHCOCH_3$ | Do. |
| 4 | $-CH_3$ | $-OCH_2CH_3$ | $-C_3H_7$ | $-CH_2CH_2OCOCH_3$ | $-NHCOCH_3$ | Do. |
| 6 | $-CH_3$ | $-OCH_2CH_3$ | $-C_2H_5$ | $-CH_2CH_2OCOCH_3$ | $-NHCOCH_3$ | Do. |
| 7 | $-CH_3$ | $-OCH_2CH_3$ | $-C_3H_7$ | $-CH_2CH_2OCOCH_3$ | $-NHCOCH_3$ | Do. |
| 8 | $-CH_3$ | $-OCH_2CH_3$ | $-C_4H_9$ | $-CH_2CH_2OCOCH_3$ | $-NHCOCH_3$ | Do. |
| 9 | $-CH_3$ | $-OCH_3$ | $-C_4H_9$ | $-CH_2CH_2OCOCH_3$ | $-NHCOCH_2CH_3$ | Do. |
| 10 | $-CH_3$ | $-OCH_3$ | $-C_3H_7$ | $-CH_2CH_2OCOCH_3$ | $-NHCOCH_2CH_3$ | Do. |
| 11 | $-CH_3$ | $-OCH_3$ | $-C_2H_5$ | $-CH_2CH_2OCOCH_3$ | $-NHCOCH_2CH_3$ | Do. |
| 12 | $-CH_3$ | $-OCH_3$ | $-CH_3$ | $-CH_2CH_2OCOCH_3$ | $-NHCOCH_2CH_3$ | Do. |
| 13 | $-CH_3$ | $-OCH_2CH_3$ | $-CH_3$ | $-CH_2CH_2OCOCH_3$ | $-NHCOCH_2CH_3$ | Do. |
| 14 | $-CH_3$ | $-OCH_2CH_3$ | $-C_2H_5$ | $-CH_2CH_2OCOCH_3$ | $-NHCOCH_2CH_3$ | Do. |
| 15 | $-CH_3$ | $-OCH_2CH_3$ | $-C_3H_7$ | $-CH_2CH_2OCOCH_3$ | $-NHCOCH_2CH_3$ | Do. |
| 16 | $-CH_3$ | $-OCH_2CH_3$ | $-C_4H_9$ | $-CH_2CH_2OCOCH_3$ | $-NHCOCH_2CH_3$ | Do. |
| 17 | $-CH_3$ | $-OCH_2CH_3$ | $-C_3H_7$ | $-CH_2CH_2COOCH_3$ | $-NHCOCH_2CH_3$ | Do. |
| 18 | $-CH_3$ | $-OCH_2CH_3$ | $-C_3H_7$ | $-CH_2CH_2COOCH_3$ | $-NHCOCH_2CH_3$ | Do. |
| 19 | $-CH_3$ | $-OCH_2CH_3$ | $-C_2H_5$ | $-CH_2CH_2COOCH_3$ | $-NHCOCH_2CH_3$ | Do. |
| 20 | $-CH_3$ | $-OCH_2CH_3$ | $-CH_3$ | $-CH_2CH_2COOCH_3$ | $-NHCOCH_2CH_3$ | Do. |
| 21 | $-CH_3$ | $-OCH_2CH_3$ | $-CH_3$ | $-CH_2CH_2COOCH_3$ | $-NHCOCH_3$ | Do. |
| 22 | $-CH_3$ | $-OCH_2CH_3$ | $-C_2H_5$ | $-CH_2CH_2COOCH_3$ | $-NHCOCH_3$ | Do. |
| 23 | $-CH_3$ | $-OCH_2CH_3$ | $-C_3H_7$ | $-CH_2CH_2COOCH_3$ | $-NHCOCH_3$ | Do. |
| 24 | $-CH_3$ | $-OCH_2CH_3$ | $-C_4H_9$ | $-CH_2CH_2COOCH_3$ | $-NHCOCH_3$ | Do. |
| 25 | $-CH_3$ | $-OCH_3$ | $-C_4H_9$ | $-CH_2CH_2COOCH_3$ | $-NHCOCH_3$ | Do. |
| 26 | $-CH_3$ | $-OCH_3$ | $-C_3H_7$ | $-CH_2CH_2COOCH_3$ | $-NHCOCH_3$ | Do. |
| 27 | $-CH_3$ | $-OCH_3$ | $-C_2H_5$ | $-CH_2CH_2COOCH_3$ | $-NHCOCH_3$ | Do. |
| 28 | $-CH_3$ | $-OCH_3$ | $-CH_3$ | $-CH_2CH_2COOCH_3$ | $-NHCOCH_3$ | Do. |
| 29 | $-CH_3$ | $-OCH_3$ | $-CH_3$ | $-CH_2CH_2COOCH_3$ | $-NHCOOCH_2CH_3$ | Do. |
| 30 | $-CH_3$ | $-OCH_3$ | $-C_2H_5$ | $-CH_2CH_2COOCH_3$ | $-NHCOOCH_2CH_3$ | Do. |
| 31 | $-CH_3$ | $-OCH_3$ | $-C_3H_7$ | $-CH_2CH_2COOCH_3$ | $-NHCOOCH_2CH_3$ | Do. |
| 32 | $-CH_3$ | $-OCH_3$ | $-C_4H_9$ | $-CH_2CH_2COOCH_3$ | $-NHCOOCH_2CH_3$ | Do. |
| 33 | $-CH_3$ | $-OCH_2CH_3$ | $-C_4H_9$ | $-CH_2CH_2COOCH_3$ | $-NHCOOCH_2CH_3$ | Do. |
| 34 | $-CH_3$ | $-OCH_2CH_3$ | $-C_3H_7$ | $-CH_2CH_2COOCH_3$ | $-NHCOOCH_2CH_3$ | Do. |
| 35 | $-CH_3$ | $-OCH_2CH_3$ | $-C_2H_5$ | $-CH_2CH_2COOCH_3$ | $-NHCOOCH_2CH_3$ | Do. |
| 36 | $-CH_3$ | $-OCH_2CH_3$ | $-CH_3$ | $-CH_2CH_2COOCH_3$ | $-NHCOOCH_2CH_3$ | Do. |
| 37 | $-CH_3$ | $-OCH_2CH_3$ | $-CH_3$ | $-CH_2CH_2COOCH_3$ | $-NHCOOCH_2CH_2Cl$ | Do. |
| 38 | $-CH_3$ | $-OCH_2CH_3$ | $-C_2H_5$ | $-CH_2CH_2COOCH_3$ | $-NHCOOCH_2CH_2Cl$ | Do. |
| 39 | $-CH_3$ | $-OCH_2CH_3$ | $-C_3H_7$ | $-CH_2CH_2COOCH_3$ | $-NHCOOCH_2CH_2Cl$ | Do. |
| 40 | $-CH_3$ | $-OCH_2CH_3$ | $-C_4H_9$ | $-CH_2CH_2COOCH_3$ | $-NHCOOCH_2CH_2Cl$ | Do. |
| 41 | $-CH_3$ | $-OCH_3$ | $-C_4H_9$ | $-CH_2CH_2COOCH_3$ | $-NHCOOCH_2CH_2Cl$ | Do. |
| 42 | $-CH_3$ | $-OCH_3$ | $-C_3H_7$ | $-CH_2CH_2COOCH_3$ | $-NHCOOCH_2CH_2Cl$ | Do. |
| 43 | $-CH_3$ | $-OCH_3$ | $-C_2H_5$ | $-CH_2CH_2COOCH_3$ | $-NHCOOCH_2CH_2Cl$ | Do. |
| 44 | $-CH_3$ | $-OCH_3$ | $-CH_3$ | $-CH_2CH_2COOCH_3$ | $-NHCOOCH_2CH_2Cl$ | Do. |
| 45 | $-CH_3$ | $-OCH_3$ | $-CH_3$ | $-CH_2CH_2OCOCH_3$ | $-NHCOOCH_2CH_2Cl$ | Do. |
| 46 | $-CH_3$ | $-OCH_3$ | $-C_2H_5$ | $-CH_2CH_2OCOCH_3$ | $-NHCOOCH_2CH_2Cl$ | Do. |
| 47 | $-CH_3$ | $-OCH_3$ | $-C_3H_7$ | $-CH_2CH_2OCOCH_3$ | $-NHCOOCH_2CH_2Cl$ | Do. |
| 48 | $-CH_3$ | $-OCH_3$ | $-C_4H_9$ | $-CH_2CH_2OCOCH_3$ | $-NHCOOCH_2CH_2Cl$ | Do. |
| 49 | $-CH_3$ | $-OCH_2CH_3$ | $-C_4H_9$ | $-CH_2CH_2OCOCH_3$ | $-NHCOOCH_2CH_2Cl$ | Do. |
| 50 | $-CH_3$ | $-OCH_2CH_3$ | $-C_3H_7$ | $-CH_2CH_2OCOCH_3$ | $-NHCOOCH_2CH_2Cl$ | Do. |
| 51 | $-CH_3$ | $-OCH_2CH_3$ | $-C_2H_5$ | $-CH_2CH_2OCOCH_3$ | $-NHCOOCH_2CH_2Cl$ | Do. |
| 52 | $-CH_3$ | $-OCH_2CH_3$ | $-CH_3$ | $-CH_2CH_2OCOCH_3$ | $-NHCOOCH_2CH_2Cl$ | Do. |
| 53 | $-CH_3$ | $-OCH_2CH_3$ | $-CH_3$ | $-CH_2CH_2OCOCH_3$ | $-NHCOCH_2CH_2Cl$ | Do. |
| 54 | $-CH_3$ | $-OCH_2CH_3$ | $-C_2H_5$ | $-CH_2CH_2OCOCH_3$ | $-NHCOCH_2CH_2Cl$ | Do. |
| 55 | $-CH_3$ | $-OCH_2CH_3$ | $-C_3H_7$ | $-CH_2CH_2OCOCH_3$ | $-NHCOCH_2CH_2Cl$ | Do. |
| 56 | $-CH_3$ | $-OCH_2CH_3$ | $-C_4H_9$ | $-CH_2CH_2OCOCH_3$ | $-NHCOCH_2CH_2Cl$ | Do. |
| 56 | $-CH_3$ | $-OCH_2CH_3$ | $-C_4H_9$ | $-CH_2CH_2OCOCH_3$ | $-NHCOCH_2CH_2Cl$ | Do. |
| 57 | $-CH_3$ | $-OCH_3$ | $-C_2H_5$ | $-CH_2CH_2OCOCH_3$ | $-NHCOCHClCH_3$ | Do. |
| 58 | $-CH_3$ | $-OCH_3$ | $-C_2H_5$ | $-CH_2CH_2OCOCH_3$ | $-NHCOCH_2CHCl_2$ | Do. |
| 59 | $-CH_3$ | $-OCH_3$ | $-C_2H_5$ | $-CH_2CH_2OCOCH_3$ | $-NHCOCH_2CH_2Cl$ | Do. |
| 60 | $-CH_3$ | $-OCH_3$ | $-C_2H_5$ | $-CH_2CH_2OCOCH_3$ | $-NHCOCH_2Cl$ | Do. |
| 61 | $-CH_3$ | $-OCH_3$ | $-C_2H_5$ | $-CH_2CH_2OCOCH_3$ | $-NHCOCH_2OCH_3$ | Do. |
| 62 | $-CH_3$ | $-OCH_3$ | $-C_2H_5$ | $-CH_2CH_2OCOCH_3$ | $-NHCOCH_2OCH_2CH_3$ | Do. |
| 63 | $-CH_3$ | $-OCH_3$ | $-C_2H_5$ | $-CH_2CH_2OCOCH_3$ | $-NHCOOCH_2CH_2OCH_3$ | Do. |
| 64 | $-CH_3$ | $-OCH_3$ | $-C_2H_5$ | $-CH_2CH_2OCOCH_3$ | $-NHCOOCH_2-\langle\rangle$ | Do. |
| 65 | $-CH_3$ | $-OCH_3$ | $-C_2H_5$ | $-CH_2CH_2OCOCH_3$ | $-NHCOO-\langle\rangle$ | Do. |
| 66 | $-CH_3$ | $-OCH_3$ | $-C_2H_5$ | $-CH_2CH_2OCOOCH_2CH_3$ | $-NHCOCH_3$ | Do. |
| 67 | $-CH_3$ | $-OC_2H_5$ | $-C_2H_5$ | $-CH_2CH_2OCOOCH_2CH_3$ | $-NHCOCH_3$ | Do. |
| 68 | $-C_2H_5$ | $-OC_2H_5$ | $-C_4H_9$ | $-CH_2CH_2OCOOCH_2CH_3$ | $-NHCOCH_3$ | Do. |
| 69 | $-C_2H_5$ | $-OCH_3$ | $-C_3H_7$ | $-CH_2CH_2OCOOCH_2CH_3$ | $-NHCOCH_3$ | Do. |
| 70 | $-C_2H_5$ | $-OCH_3$ | $-C_2H_5$ | $-CH_2CH_2OCOOCH_2CH_3$ | $-NHCOCH_3$ | Do. |
| 71 | $-C_2H_5$ | $-OCH_3$ | $-C_2H_5$ | $-CH_2CH_2OCOOCH_2CH_3$ | $-NHCOCH_2CH_3$ | Do. |
| 72 | $-C_2H_5$ | $-OCH_3$ | $-C_2H_5$ | $-CH_2CH_2OCOOCH_2CH_3$ | $-NHCOOCH_2CH_3$ | Do. |
| 73 | $-C_2H_5$ | $-OCH_3$ | $-C_4H_9$ | $-CH_2CH_2OCOOCH_2CH_3$ | $-NHCOOCH_2CH_3$ | Do. |
| 74 | $-C_2H_5$ | $-OCH_3$ | $-C_3H_7$ | $-CH_2CH_2OCOOCH_2CH_3$ | $-NHCOCH_2CH_3$ | Do. |
| 75 | $-C_2H_5$ | $-OCH_3$ | $-CH_3$ | $-CH_2CH_2OCOOCH_2CH_3$ | $-NHCOCH_2CH_3$ | Do. |
| 76 | $-CH_3$ | $-OCH_2CH_3$ | $-C_2H_5$ | $-CH_2CH_2OCOCH_2COCH_3$ | $-NHCOCH_2CH_3$ | Do. |
| 77 | $-CH_3$ | $-OCH_2CH_3$ | $-C_3H_7$ | $-CH_2CH_2OCOCH_2COCH_3$ | $-NHCOCH_2CH_3$ | Do. |
| 78 | $-CH_3$ | $-OCH_2CH_3$ | $-C_4H_9$ | $-CH_2CH_2OCOCH_2COCH_3$ | $-NHCOCH_2CH_3$ | Do. |
| 79 | $-CH_3$ | $-OCH_2CH_3$ | $-CH_3$ | $-CH_2CH_2OCOCH_2COCH_3$ | $-NHCOCH_2CH_3$ | Do. |
| 80 | $-CH_3$ | $-OCH_2CH_3$ | $-C_3H_7$ | $-CH_2CH_2OCOCH_2Cl$ | $-NHCOCH_2CH_3$ | Do. |
| 81 | $-CH_3$ | $-OCH_2CH_3$ | $-C_2H_5$ | $-CH_2CH_2OCOCH_2Cl$ | $-NHCOCH_2CH_3$ | Do. |
| 82 | $-CH_3$ | $-OCH_2CH_3$ | $-C_4H_9$ | $-CH_2CH_2OCOCH_2Cl$ | $-NHCOCH_2CH_3$ | Do. |
| 87 | $-CH_3$ | $-OCH_2CH_3$ | $-CH_3$ | $-CH_2CH_2OCOCH_2Cl$ | $-NHCOCH_2CH_3$ | Do. |
| 84 | $-CH_3$ | $-OCH_2CH_3$ | $-C_2H_5$ | $-CH_2CH_2OCOCH_2CH_2Cl$ | $-NHCOCH_2CH_3$ | Do. |
| 85 | $-CH_3$ | $-OCH_2CH_3$ | $-C_3H_7$ | $-CH_2CH_2OCOCH_2CH_2Cl$ | $-NHCOCH_2CH_3$ | Do. |
| 86 | $-CH_3$ | $-OCH_2CH_3$ | $-C_4H_9$ | $-CH_2CH_2OCOCH_2CH_2Cl$ | $-NHCOCH_2CH_3$ | Do. |
| 87 | $-CH_3$ | $-OCH_2CH_3$ | $-CH_3$ | $-CH_2CH_2OCOCH_2CH_2Cl$ | $-NHCOCH_2CH_3$ | Do. |

| Example No. | R₁ | R₂ | R₃ | R₄ | R₅ | Shade on Polyester Fibre |
|---|---|---|---|---|---|---|
| 88 | —CH₃ | —OCH₂CH₃ | —C₂H₅ | —CH₂CH₂OCOCH₂CN | —NHCOCH₂CH₃ | Blue. |
| 89 | —CH₃ | —OCH₂CH₃ | —CH₃ | —CH₂CH₂OCOCH₂CN | —NHCOCH₂CH₃ | Do. |
| 90 | —CH₃ | —OCH₂CH₃ | —C₃H₇ | —CH₂CH₂OCOCH₂CN | —NHCOCH₂CH₃ | Do. |
| 91 | —CH₃ | —OCH₃ | —C₄H₉ | —CH₂CH₂OCOCH₂CN | —NHCOCH₃ | Do. |
| 92 | —CH₃ | —OCH₃ | —C₄H₉ | —CH₂CH₂OCOCH₂OCH₃ | —NHCOCH₃ | Do. |
| 93 | —CH₃ | —OCH₃ | —C₂H₅ | —CH₂CH₂OCOCH₂OCH₃ | —NHCOCH₃ | Do. |
| 94 | —CH₃ | —OCH₃ | —C₃H₇ | —CH₂CH₂OCOCH₂OCH₃ | —NHCOOCH₃ | Do. |
| 95 | —CH₃ | —OCH₃ | —CH₃ | —CH₂CH₂OCOCH₂OCH₃ | —NHCOOCH₂CH₃ | Do. |
| 96 | —CH₃ | —OCH₂CH₃ | —C₂H₅ | —CH₂CH₂COOCH₃ | —NHCOOC₃H₇ | Do. |
| 97 | —CH₃ | —OCH₂CH₃ | —C₂H₅ | —CH₂CH₂COOCH₂CH₃ | —NHCOOC₃H₇ | Do. |
| 98 | —CH₂CN | —OCH₂CH₃ | —C₂H₅ | —CH₂CH₂OCOCH₂CN | —NHCOOC₃H₇ | Do. |
| 99 | —CH₂CH₂OH | —OCH₂CH₃ | —C₂H₅ | —CH₂CH₂OCOCH₂CH₂CN | —NHCOOC₃H₇ | Do. |
| 100 | —CH₂CH₂Cl | —OCH₃ | —C₄H₉ | —CH₂CH₂OCOCH₃ | —NHCOOC₃H₇ | Do. |
| 101 | —CH₂Cl | —OCH₃ | —C₃H₇ | —CH₂CH₂OCOCH₃ | —NHCOOC₃H₇ | Do. |
| 102 | —CH₂Cl | —OCH₃ | —C₂H₅ | —CH₂CH₂OCOCH₃ | —NHCOOC₃H₇ | Do. |
| 103 | —CH₂Cl | —OCH₃ | —C₂H₅ | —CH₂CH₂OCOCH₃ | —NHCOOC₃H₇ | Do. |
| 104 | —CH₂Cl | —OCH₃ | —C₃H₇ | —CH₂CH₂OCOCH₂CH₃ | —NHCOOC₃H₇ | Do. |
| 105 | —CH₂Cl | —OCH₃ | —C₂H₅ | —CH₂CH₂OCOCH₂CH₃ | —NHCOCH₂CH₃ | Do. |
| 106 | —CH₂Cl | —OCH₃ | —C₂H₅ | —CH₂CH₂OCOCH₂CH₃ | —NHCOOCH₂CH₃ | Do. |
| 107 | —CH₂Cl | —OCH₂CH₃ | —C₂H₅ | —CH₂CH₂OCOCH₂CH₃ | —NHCOOCH₂CH₃ | Do. |
| 108 | —CH₂Cl | —OCH₂CH₃ | —C₂H₅ | —CH₂CH₂OCOOCH₂CH₃ | —NHCOOCH₂CH₃ | Do. |
| 109 | —CH₂Cl | —OCH₂CH₃ | —C₄H₉ | —CH₂CH₂OCOOCH₂CH₃ | —NHCOCH₃ | Do. |
| 110 | —CH₂Cl | —OCH₂CH₃ | —C₃H₅ | —CH₂CH₂OCOCH₃ | —NHCOCH₃ | Do. |
| 111 | —CH₂Cl | —OCH₂CH₃ | —C₂H₅ | —CH₂CH₂OCOCH₂COCH₃ | —NHCOCH₃ | Do. |
| 112 | —CH₂Cl | —OCH₂CH₃ | —C₂H₅ | —CH₂CH₂OCOCH₂CN | —NHCOCH₃ | Do. |
| 113 | —CH₂Cl | —OCH₃ | —C₂H₅ | —CH₂CH₂OCOCH₂CN | —NHCOCH₃ | Do. |
| 114 | —CH₂CN | —OCH₃ | —C₂H₅ | —CH₂CH₂OCOCH₃ | —NHCOCH₃ | Do. |
| 115 | —CH₂CN | —OCH₃ | —C₃H₇ | —CH₂CH₂OCOCH₃ | —NHCOCH₃ | Do. |
| 116 | —CH₂CN | —OCH₂CH₃ | —C₄H₉ | —CH₂CH₂COOCH₃ | —NHCOCH₃ | Do. |
| 117 | —CH₂CN | —OCH₂CH₃ | —C₂H₅ | —CH₂CH₂COOCH₃ | —NHCOCH₃ | Do. |
| 118 | —CH₂CN | —OCH₃ | —C₂H₅ | —CH₂CH₂OCOCH₃ | —NHCOCH₂CH₂Br | Do. |
| 119 | —CH₂Cl | —OCH₃ | —C₂H₅ | —CH₂CH₂OCOCH₃ | —NHCOCH₂CH₂Br | Do. |
| 120 | —CH₂Cl | —OCH₂CH₃ | —C₂H₅ | —CH₂CH₂OCOCH₃ | —NHCOCH₂CH₂Br | Do. |
| 121 | —CH₃ | —OCH₃ | —C₄H₉ | —CH₂CH₂OCOCH₃ | —NHCOCH₂CH₂Br | Do. |
| 122 | —C₂H₅ | —OCH₃ | —C₄H₉ | —CH₂CH₂OCOCH₃ | —NHCOCH₂CH₂Br | Do. |
| 123 | —C₂H₅ | —OCH₃ | —C₃H₇ | —CH₂CH₂OCOCH₃ | —NHCOCH₂CH₂Br | Do. |
| 124 | —C₂H₅ | —OCH₃ | —C₄H₉ | —CH₂CH₂COOCH₃ | —NHCOCH₂CH₂Br | Do. |
| 125 | —C₂H₅ | —OCH₃ | —C₂H₅ | —CH₂CH₂COOCH₃ | —NHCOCH₂CH₂Br | Do. |
| 126 | —C₂H₅ | —OCH₃ | —C₂H₅ | —CH₂CH₂OCOCH₃ | —NHCOCH₂CH₂Br | Do. |
| 127 | —C₂H₅ | —OCH₃ | —C₄H₉ | —CH₂CH₂OCOCH₃ | —NHCOOCH₂CH₂Br | Do. |
| 128 | —C₂H₅ | —OCH₃ | —C₂H₅ | —CH₂CH₂OCOCH₃ | —NHCOOCH₂CH₂Br | Do. |
| 129 | —C₂H₅ | —OCH₃ | —C₂H₅ | —CH₂CH₂OCOCH₃ | —NHCOCH₃ | Do. |
| 130 | —C₂H₅ | —OC₂H₅ | —C₂H₅ | —CH₂CH₂OCOCH₃ | —NHCOOCH₂CH₂Br | Do. |
| 131 | —CH₂Cl | —OCH₃ | —C₂H₅ | —CH₂CH₂OCOCH₃ | —OCH₃ | Do. |
| 132 | —CH₃ | —OCH₃ | —C₂H₅ | —CH₂CH₂OCOCH₃ | —OCH₂CH₃ | Do. |
| 133 | —CH₃ | —OCH₂CH₃ | —C₂H₅ | —CH₂CH₂OCOCH₃ | —OCH₂CH₃ | Do. |
| 134 | —CH₃ | —OCH₂CH₃ | —C₄H₉ | —CH₂CH₂OCOCH₃ | —OCH₃ | Do. |
| 135 | —CH₃ | —OCH₃ | —C₂H₅ | —CH₂CH₂COOCH₃ | —OCH₃ | Do. |
| 136 | —CH₃ | —OCH₃ | —C₂H₅ | —CH₂CH₂COOCH₂CH₃ | —OCH₂CH₃ | Do. |
| 137 | —CH₃ | —OCH₂CH₃ | —C₂H₅ | —CH₂CH₂COOCH₂CH₃ | —OCH₂CH₃ | Do. |
| 138 | —CH₃ | —OCH₂CH₃ | —C₂H₅ | —CH₂CH₂OCOOCH₂CH₃ | —OCH₂CH₃ | Do. |
| 139 | —CH₂Cl | —OCH₂CH₃ | —C₂H₅ | —CH₂CH₂OCOOCH₂CH₃ | —OCH₂CH₃ | Do. |
| 140 | —CH₂CH₃ | —OCH₃ | —C₂H₅ | —CH₂CH₂OCOCH₃ | —OCH₂CH₃ | Do. |
| 141 | —CH₂CH₃ | —OCH₃ | —C₂H₅ | —CH₂CH₂OCOCH₃ | —NHCOCH₃ | Do. |
| 142 | —CH₂CH₂Cl | —OCH₂CH₃ | —C₂H₅ | —CH₂CH₂OCOCH₂CH₃ | —NHCOCH₃ | Do. |
| 143 | —CH₂CH₂Cl | —OCH₂CH₃ | —C₂H₅ | —CH₂CH₂COOCH₃ | —NHCOCH₃ | Do. |
| 144 | —CH₂CH₂Cl | —OCH₂CH₃ | —C₂H₅ | —CH₂CH₂COOCH₃ | —NHCOCH₂CH₃ | Do. |
| 145 | —CH₂CH₂Cl | —OCH₂CH₃ | —C₂H₅ | —CH₂CH₂COOCH₃ | —NHCOCH₂CH₃ | Do. |
| 146 | —CH₂CH₂Cl | —OCH₂CH₃ | —C₂H₅ | —CH₂CH₂OCOCH₃ | —NHCOCH₂OCH₃ | Do. |
| 147 | —CH₂CH₂Cl | —OCH₂CH₃ | —C₂H₅ | —CH₂CH₂OCOCH₃ | —NHCOCH₂CH₂Cl | Do. |
| 148 | —CH₂CH₂Cl | —OCH₂CH₃ | —C₂H₅ | —CH₂CH₂OCOOCH₃ | —NHCOCH₂CH₂Cl | Do. |
| 149 | —CH₂CH₂Cl | —OCH₂CH₃ | —C₂H₅ | —CH₂CH₂OCOOCH₃ | —NHCOCH₃ | Do. |
| 150 | —CH₂CH₂Cl | —OCH₂CH₃ | —C₂H₅ | —CH₂CH₂OCOOCH₃ | —NHCOOCH₃ | Do. |
| 151 | —CH₂CH₂Cl | —OCH₂CH₃ | —C₂H₅ | —CH₂CH₂OCOOCH₃ | —NHCOOCH₃ | Do. |
| 152 | —CH₂CH₂Cl | —CH₃ | —C₂H₅ | —CH₂CH₂OCOCH₂OCH₂CH₃ | —NHCOOCH₃ | Do. |
| 153 | —CH₃ | —CH₃ | —C₂H₅ | —CH₂CH₂OCOCH₂OCH₂CH₃ | —NHCOCH₃ | Do. |
| 154 | —CH₃ | —CH₃ | —CH₃ | —CH₂CH₂OCOCH₂CH₂OCH₃ | —NHCOCH₃ | Do. |
| 155 | —CH₃ | —CH₃ | —C₂H₅ | —CH₂CH₂OCOCH₂CH₂OCH₃ | —NHCOCH₂CH₃ | Do. |
| 156 | —CH₃ | —CH₃ | —CH₃ | —CH₂CH₂OCOCH₂CH₂OCH₂CH₃ | —NHCOCH₂CH₃ | Do. |
| 157 | —CH₃ | —CH₃ | —C₂H₅ | —CH₂CH₂OCOCH₂CH₂OCH₂CH₃ | —NHCOCH₃ | Do. |
| 158 | —CH₃ | —CH₃ | —C₂H₅ | —CH₂CH₂OCOCH₂CH₂OCH₂CH₃ | —NHCOCH₃ | Do. |
| 159 | —CH₃ | —CH₃ | —C₂H₅ | —CH₂CH₂OCOCH₂CHCH₃ <br> \| <br> OCH₃ | —NHCOCH₃ | Do. |
| 160 | —CH₃ | —CH₃ | —C₂H₅ | —CH₂CH₂OCOCH₂CHCH₃ <br> \| <br> OCH₃ | —NHCOCH₂CH₂Cl | Do. |
| 161 | —CH₃ | —CH₃ | —C₂H₅ | —CH₂CH₂OCOCH₂OCH₂CH₃ | —NHCOCH₃ | Do. |
| 162 | —CH₃ | —CH₃ | —C₂H₅ | —CH₂CH₂OCOCH₂OCH₂CH₂CH₃ | —NHCOCH₃ | Do. |
| 163 | —CH₃ | —CH₃ | —C₂H₅ | —CH₂CH₂OCOCH₂COCH₂CH₃ | —NHCOCH₃ | Do. |
| 164 | —CH₃ | —CH₃ | —C₂H₅ | —CH₂CH₂OCOCH₂CH₂COCH₂CH₃ | —NHCOCH₃ | Do. |
| 165 | —CH₃ | —OCH₃ | —CH₂CH₃ | —CH₂CH₂OCOCH₂CH₂Br | —NHCOCH₃ | Do. |
| 166 | —CH₃ | —OCH₂CH₃ | —CH₂CH₃ | —CH₂CH₂OCOCH₂CH₂Br | —NHCOCH₂CH₂Br | Do. |
| 167 | —CH₃ | —OCH₂CH₃ | —CH₂CH₃ | —CH₂CH₂OCOCH₂CH₂Br | —NHCOOCH₂CH₃ | Do. |
| 168 | —CH₃ | —OCH₂CH₃ | —CH₂CH₃ | —CH₂CH₂OCOCH₂CH₂Br | —NHCOOCH₂CH₃ | Do. |
| 169 | —CH₃ | —OCH₂CH₃ | —CH₂CH₃ | —CH₂CH₂OCOCH₂Br | —NHCOCH₃ | Do. |
| 170 | —CH₃ | —OCH₂CH₃ | —CH₂CH₃ | —CH₂CH₂OCOCH₂Br | —NHCOCH₃ | Do. |
| 171 | —CH₃ | —OCH₂CH₃ | —CH₂CH₃ | —CH₂CH₂OCOCHCH₃ <br> \| <br> Br | —NHCOCH₃ | Do. |
| 172 | —CH₂Br | —OCH₂CH₃ | —CH₂CH₃ | —CH₂CH₂OCOCHCH₂ <br> \| <br> Br | —NHCOCH₃ | Do. |
| 173 | —CH₂Br | —OCH₃ | —CH₂CH₃ | —CH₂CH₂OCOCHCH₂ <br> \| <br> Br | —NHCOCH₃ | Do. |
| 174 | —CH₂Br | —OCH₃ | —CH₂CH₃ | —CH₂CH₂OCOCH₃ | —NHCOCH₃ | Do. |
| 175 | —CH₂Br | —OCH₂CH₃ | —CH₂CH₃ | —CH₂CH₂OCOCH₃ | —NHCOCH₃ | Do. |

| Example No. | $R_1$ | $R_2$ | $R_3$ | $R_4$ | $R_5$ | Shade on Polyester Fibre |
|---|---|---|---|---|---|---|
| 176 | —$CH_2Br$ | —$OCH_2CH_3$ | —$C_4H_9$ | —$CH_2CH_2OCOCH_3$ | —$NHCOCH_3$ | Blue. |
| 177 | —$CH_2Br$ | —$OCH_2CH_3$ | —$C_4H_9$ | —$CH_2CH_2OCOCH_3$ | —$NHCOCH_2CH_3$ | Do. |
| 178 | —$CH_2Br$ | —$OCH_2CH_3$ | —$C_4H_9$ | —$CH_2CH_2OCOCH_3$ | —$NHCOOCH_3$ | Do. |
| 179 | —$CH_2Br$ | —$OCH_2CH_3$ | —$C_2H_5$ | —$CH_2CH_2OCOCH_3$ | —$NHCOOCH_3$ | Do. |
| 180 | —$CH_2Br$ | —$OCH_2CH_3$ | —$C_2H_5$ | —$CH_2CH_2COOCH_3$ | —$NHCOOCH_3$ | Do. |
| 181 | —$CH_2Br$ | —$OCH_3$ | —$C_2H_5$ | —$CH_2CH_2COOCH_3$ | —$NHCOOCH_3$ | Do. |
| 182 | —$CH_3$ | —$OCH_3$ | —$C_2H_5$ | —$CH_2CH_2OCOOCH_2CH_3$ | —$NHCOCH_2OCH_3$ | Do. |
| 183 | —$CH_3$ | —$OCH_3$ | —$C_2H_5$ | —$CH_2CH_2COOCH_3$ | —$NHCOCH_2OCH_3$ | Do. |
| 184 | —$CH_3$ | —$OCH_3$ | —$C_2H_5$ | —$CH_2CH_2COOCH_3$ | —$NHCOCH_2OCH_2CH_3$ | Do. |
| 185 | —$CH_3$ | —$OCH_2CH_3$ | —$C_4H_9$ | —$CH_2CH_2COOCH_3$ | —$NHCOCH_2OCH_2CH_3$ | Do. |
| 186 | —$CH_3$ | —$OCH_2CH_3$ | —$C_4H_9$ | —$CH_2CH_2OCOCH_2CH_3$ | —$NHCOCH_2OCH_2CH_3$ | Do. |
| 187 | —$CH_3$ | —$OCH_2CH_3$ | —$C_4H_9$ | —$CH_2CH_2OCOCH_2CH_3$ | —$NHCOCH_2CH_2OCH_3$ | Do. |
| 188 | —$CH_3$ | —$OCH_2CH_3$ | —$C_3H_7$ | —$CH_2CH_2OCOCH_3$ | —$NHCOCH_2CH_2OCH_3$ | Do. |
| 189 | —$CH_3$ | —$OCH_2CH_3$ | —$C_2H_5$ | —$CH_2CH_2OCOCH_3$ | —$NHCOCHCH_2CH_3$ <br>      $OCH_3$ | Do. |
| 190 | —$CH_3$ | —$OCH_3$ | —$CH_2CH_3$ | —$CH_2CH_2OCOCH_3$ | —$NHCOCH_2CH_2OCH_3$ | Do. |
| 191 | —$CH_3$ | —$OCH_2CH_3$ | —$CH_2CH_3$ | —$CH_2CH_2OCOCH_3$ | —$NHCOCH_2CH_2OCH_3$ | Do. |
| 192 | —$CH_3$ | —$OCH_3$ | —$CH_2CH_3$ | —$CH_2CH_2COOCH_3$ | —$NHCOCH_2CH_2OCH_3$ | Do. |
| 193 | —$CH_3$ | —$OCH_2CH_3$ | —$CH_2CH_3$ | —$CH_2CH_2OCOCH_3$ | —$NHCOCH_2CH_2OCH_3$ | Do. |
| 194 | —$CH_3$ | —$OCH_2CH_3$ | —$CH_2CH_3$ | —$CH_2CH_2OCOOCH_3$ | —$NHCOCH_2CH_2OCH_2CH_3$ | Do. |
| 195 | —$CH_3$ | —$OCH_2CH_3$ | —$CH_2CH_3$ | —$CH_2CH_2COOCH_3$ | —$NHCOCH_2CH_2OCH_2CH_3$ | Do. |
| 196 | —$CH_3$ | —$OCH_3$ | —$C_4H_9$ | —$CH_2CH_2OCOCH_3$ | —$NHCOCH_2CH_2OCH_2CH_3$ | Do. |
| 197 | —$CH_3$ | —$OCH_3$ | —$CH_2CH_3$ | —$CH_2CH_2COOCH_3$ | —$NHOCCH_2CH_2OCH_2CH_3$ | Do. |
| 198 | —$CH_3$ | —$OCH_3$ | —$CH_2CH_3$ | —$CH_2CH_2OCOCH_3$ | —$NHCOCH_2CH_2OCH_2CH_3$ | Do. |
| 199 | —$CH_3$ | —$OCH_3$ | —$CH_2CH_3$ | —$CH_2CH_2COOCH_3$ | —$NHCOCH_2CH_2OCH_2CH_3$ | Do. |
| 200 | —$CH_3$ | —$OCH_3$ | —$CH_2CH_3$ | —$CH_2CH_2OCOCH_3$ | —$NHCOCH_2OCH(CH_3)_2$ | Do. |
| 201 | —$CH_3$ | —$OCH_3$ | —$CH_2CH_3$ | —$CH_2CH_2OCOCH_3$ | —$NHCOCH_2OCH(CH_3)_2$ | Do. |
| 202 | —$CH_3$ | —$OCH_3$ | —$CH_2CH_3$ | —$CH_2CH_2OCOOCH_3$ | —$NHCOCH_2OCH(CH_3)_2$ | Do. |
| 203 | —$CH_3$ | —$OCH_2CH_3$ | —$CH_2CH_3$ | —$CH_2CH_2OCOCH_3$ | —$NHCOCH_2OCH(CH_3)_2$ | Do. |
| 204 | —$CH_3$ | —$OCH_2CH_3$ | —$CH_2CH_3$ | —$CH_2CH_2OCOCH_3$ | —$NHCOCH_2OCH(CH_3)_2$ | Do. |
| 205 | —$CH_3$ | —$OCH_2CH_3$ | —$CH_2CH_3$ | —$CH_2CH_2OCOCH_3$ | —$NHCOCH_2OCH(CH_3)_2$ | Do. |
| 206 | —$CH_3$ | —$OCH_2CH_3$ | —$CH_2CH_3$ | —$CH_2CH_2OCOCH_3$ | —$NHCOOCH_2CH_2CH_3$ | Do. |
| 207 | —$CH_3$ | —$OCH_2CH_3$ | —$CH_2CH_3$ | —$CH_2CH_2OCOOCH_3$ | —$NHCOOCH_2CH_2CH_3$ | Do. |
| 208 | —$CH_3$ | —$OCH_2CH_3$ | —$C_4H_9$ | —$CH_2CH_2OCOCH_3$ | —$NHCOOCH_2CH_2CH_3$ | Do. |
| 209 | —$CH_3$ | —$OCH_3$ | —$C_4H_9$ | —$CH_2CH_2OCOCH_3$ | —$NHCOOCH_2CH_2CH_3$ | Do. |
| 210 | —$CH_3$ | —$OCH_3$ | —$CH_2CH_3$ | —$CH_2CH_2OCOCH_3$ | —$NHCOOCH_2CH_2CH_3$ | Do. |
| 211 | —$CH_2Cl$ | —$OCH_3$ | —$CH_2CH_3$ | —$CH_2CH_2OCOCH_3$ | —$NHCOOCH_2CH_2CH_3$ | Do. |
| 212 | —$CH_2Br$ | —$OCH_3$ | —$CH_2CH_3$ | —$CH_2CH_2OCOCH_3$ | —$NHCOOCH_2CH_2CH_3$ | Do. |

Formulae of representative dyes of the foregoing examples are as follows:

EXAMPLE 1

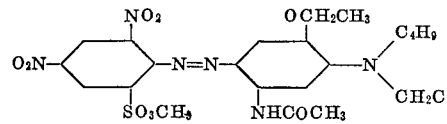

EXAMPLE 3

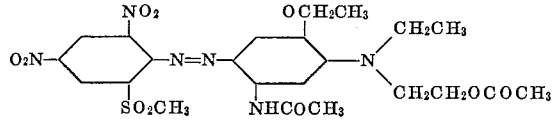

EXAMPLE 6

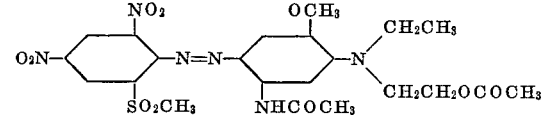

EXAMPLE 11

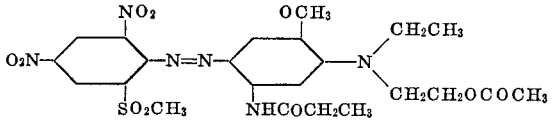

EXAMPLE 14

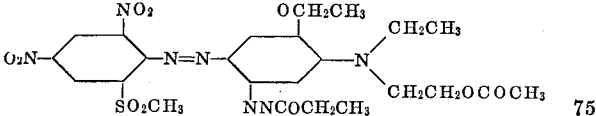

EXAMPLE 22

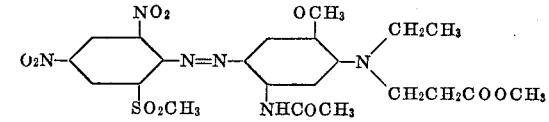

EXAMPLE 30

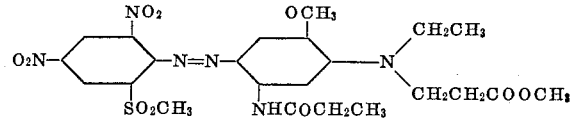

Having thus disclosed the invention what we claim is:
1. Disperse dyes of the formula $$\text{O}_2\text{N}-\underset{\underset{\text{SO}_2\text{R}_6}{|}}{\overset{\overset{\text{NO}_2}{|}}{\bigcirc}}-\text{N}=\text{N}-\underset{\underset{\text{R}_{10}}{|}}{\overset{\overset{\text{R}_7}{|}}{\bigcirc}}-\text{N}\underset{\text{R}_9}{\overset{\text{R}_8}{\diagup}}$$

(IV)

where
$R_6$ is a member selected from the group consisting of unsubstituted and chloro-, bromo- and cyano-substituted methyl, unsubstituted and hydroxy-substituted ethyl,
$R_7$ stands for a member selected from the group consisting of methoxy and ethoxy,
$R_8$ stands for methyl, ethyl, propyl and butyl,
$R_9$ is a member selected from a group of radicals consisting of acetoxyethyl, chloroacetoxyethyl, ethoxyacetoxyethyl, propyloxyacetoxyethyl, butoxyacetoxyethyl, acetoxyacetoxyethyl, propionylacetoxyethyl, butyrylacetoxyethyl, propionyloxyethyl, methoxycarbonylethyl, chloromethoxycarbonylethyl, methoxymethoxycarbonylethyl, ethoxycarbonylethyl, methoxyethovycarbonylethyl, propyloxycarbonylethyl, methoxycarbonyloxyethyl, ethoxycarbonyloxyethyl, (2 - methoxypropyl)carbonyloxyethyl, propionyloxyethyl, bromopropionyloxyethyl, methoxypropionyloxyethyl, chloromethoxypropionyloxyethyl, cyanonmethoxypropionyloxyethyl, ethoxypropionyloxyethyl and propionylpropionyloxyethyl, $R_{10}$ is a member selected from the group of radicals consisting of methoxy, ethoxy, acetylamino, chloroacetylamino, methoxyacetylamino, ethoxyacetylamino, propyloxyacetylamino, methoxycarbonylamino, ethoxycarbonylamino, propylcarbonylamino, propyloxycarbonylamino chloro- and bromoethoxycarbonylamino, methoxyethoxycarbonylamino, phenyloxycarbonylamino, phenylmethoxycarbonylamino, propionylamino, chloro- and bromo-propionylamino, methoxypropionylamino and ethoxypropionylamino.

2. A disperse dye of the formula

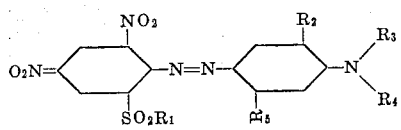

wherein $R_1$ is a member selected from the group consisting of unsubstituted and substituted alkyl, the alkyl having from 1 to 2 carbons, inclusive, and any substituent being selected from the group consisting of chlorine and bromine, cyano and hydroxy;

$R_2$ is a member selected from the group consisting of methoxy and ethoxy;

$R_3$ is a member selected from the group consisting of methyl, ethyl, propyl and butyl;

$R_4$ is a member selected from the group consisting of unsubstituted and substituted alkylcarbonyloxyalkyl, alkoxycarbonylalkyl and alkoxycarbonyloxyalkyl, each substituent being a member selected from the group consisting of chlorine and bromine, cyano, alkoxy and alkylcarbonyl, and each alkyl and each alkoxy having at most four carbon atoms; and $R_5$ is a member selected from the group consisting of alkyl, alkoxy, and substituted and unsubstituted alkylcarbonylamino, alkoxycarbonylamino, phenalkylcarbonylamino, alkoxycarbonylamino and phenoxycarbonylamino, each substituent being a member selected from the group consisting of chlorine and bromine, and alkoxy, and each alkyl and each alkoxy having at most three carbon atoms.

3. A dye according to claim 1 wherein $R_4$ is an alkylcarbonyloxyalkyl.

4. A dye according to claim 1 wherein $R_4$ is an alkoxycarbonylalkyl.

5. A dye according to claim 1 wherein $R_4$ is an alkoxycarbonyloxyalkyl.

6. The dye of the formula:

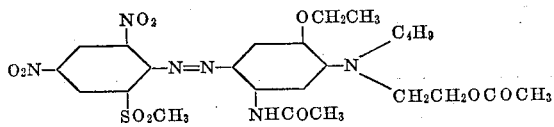

7. The dye of the formula:

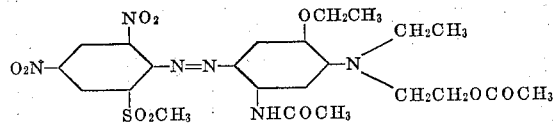

8. The dye of the formula:

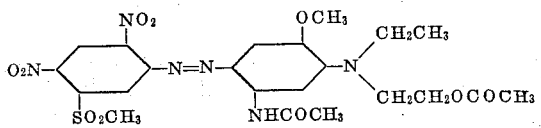

9. The dye of the formula:

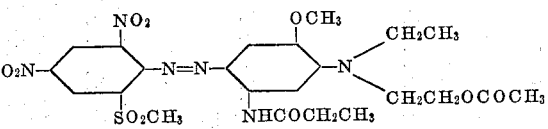

10. The dye of the formula:

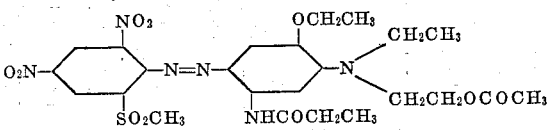

11. The dye of the formula:

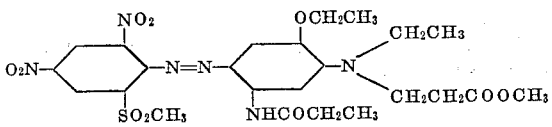

12. The dye of the formula:

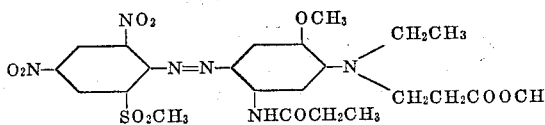

References Cited

UNITED STATES PATENTS

| | | | |
|---|---|---|---|
| 2,111,300 | 3/1938 | Senn | 260—207 |
| 3,268,507 | 8/1966 | Kruckenberg | 260—207 |
| 3,342,803 | 9/1967 | Artz et al. | 260—207 |

CHARLES B. PARKER, Primary Examiner.

D. M. PAPUGA, Assistant Examiner.

U.S. Cl X.R.

260—206, 37, 465, 471; 8—41, 55

UNITED STATES PATENT OFFICE
CERTIFICATE OF CORRECTION

Patent No. 3,428,622  Dated February 18, 1969

Inventor(s) Ruedi Altermatt and Curt Mueller

It is certified that error appears in the above-identified patent and that said Letters Patent are hereby corrected as shown below:

Column 1, line 39, "carbonyloxyalkyl; and" should read --carbonyloxyalkyl and-- line 65, "(IV" should read --(IV)--. Column 2, line 27, "2-amino2" should read --2-amino-3--; line 32, "-1,β' " should read -- -1-β'--, line 41, "ethoxyl" should read --ethoxy-1--; line 49, "(3'-acetoxypropyl)" should read --(3'-acetoxypropyl)- --; line 50, "(2'acetoxyethyl)" should read --(2'-acetoxyethyl)--; line 58, "(2'." should read --(2'- --; line 62, "(2' acetoxyethyl)" should read --(2'-acetoxyethyl)--. Column 3, line 26, "Diiolen" should read --Diolen--; line 63, "products" should read --products,--. Column 5, Example 3, "-OCH$_3$CH$_3$" should read -- -OCH$_2$CH$_3$--; second example "3" should read --4--; example "4" should read --5--; in Example 4, "C$_2$H$_5$" should read --C$_3$H$_7$--; In each example 5, 6, 7 and 8, "-OCH$_2$CH$_3$" should read -- -OCH$_3$--; Example 5, "-C$_3$H$_7$" should read -- -CH$_3$--; Example 11, "-NHCOCH$_2$CH$_3$" should read -- -NHCOCH$_2$CH$_3$--; Example 11, "Doi" should read --Do.--; Example 17, "-CH$_7$" should read -- -C$_4$H$_9$--; Example 32, "-C$_3$H$_9$" should read -- -C$_4$H$_9$--; Example 58, "-OCH$_2$" should read -- -OCH$_3$--. Column 10, upper right portion of formula for Example 22, "OCH$_3$" should read --OCH$_2$CH$_3$--; line 60, "cosnisting" should read --consisting--. Column 12, claim 11, "NHCOCH$_2$CH$_3$" should read --NHCOCH$_3$--.

SIGNED AND
SEALED
APR 28 1970

(SEAL)
Attest:

Edward M. Fletcher, Jr.
Attesting Officer

WILLIAM E. SCHUYLER, JR.
Commissioner of Patents